US009297908B2

(12) United States Patent
Safa

(10) Patent No.: US 9,297,908 B2
(45) Date of Patent: Mar. 29, 2016

(54) METHOD AND APPARATUS FOR PROBING NUCLEAR MATERIAL BY PHOTOFISSION

(75) Inventor: Henri Safa, Gif-sur-Yvette (FR)

(73) Assignee: Commissariat A L'Energie Atomique, Paris (FR)

(*) Notice: Subject to any disclaimer, the term of this patent is extended or adjusted under 35 U.S.C. 154(b) by 1020 days.

(21) Appl. No.: 11/570,829

(22) PCT Filed: Jun. 14, 2005

(86) PCT No.: PCT/FR2005/001462
§ 371 (c)(1),
(2), (4) Date: Jul. 25, 2008

(87) PCT Pub. No.: WO2006/008360
PCT Pub. Date: Jan. 26, 2006

(65) Prior Publication Data
US 2009/0065693 A1 Mar. 12, 2009

(30) Foreign Application Priority Data
Jun. 21, 2004 (FR) .................................... 04 06735

(51) Int. Cl.
G01T 1/167 (2006.01)
G01T 3/00 (2006.01)

(52) U.S. Cl.
CPC .. *G01T 1/167* (2013.01); *G01T 3/00* (2013.01)

(58) Field of Classification Search
USPC ........... 376/100, 157, 190, 153, 154; 250/310
See application file for complete search history.

(56) References Cited

U.S. PATENT DOCUMENTS

| 3,178,578 A | * | 4/1965 | Gale ............................. 378/137 |
| 3,262,274 A | * | 7/1966 | Nelson, Jr. ......................... 588/3 |
| 4,320,298 A | * | 3/1982 | Buford et al. .............. 250/358.1 |
| 4,497,768 A | * | 2/1985 | Caldwell et al. ............... 376/153 |
| 5,002,721 A | * | 3/1991 | Bernard et al. ................ 376/159 |
| 5,223,181 A | * | 6/1993 | Wilson et al. ..................... 588/1 |
| 5,396,074 A | * | 3/1995 | Peck et al. ............... 250/454.11 |

(Continued)

FOREIGN PATENT DOCUMENTS

| FR | 2 726 090 A | 4/1996 |
| FR | 2 764 383 A | 12/1998 |
| WO | WO 00/62099 A | 10/2000 |
| WO | WO-2005/047852 A2 * | 5/2005 |

OTHER PUBLICATIONS

Bramblett, R.L., enhanced abstract to "The Use of electron accelerators for nondestructive assay of nuclear materiaols", Int. J. Nondestructive Testing, vol. 2, issue 2, pp. 99-127 as released by the Defense Technical Information Center, Accession No. AD0190430.*

(Continued)

*Primary Examiner* — Jack W Keith
*Assistant Examiner* — Daniel Wasil
(74) *Attorney, Agent, or Firm* — Alston & Bird LLP

(57) ABSTRACT

The invention relates to a method and a system for using photofission to probe an article containing potentially radiation-emitting elements. The article is bombarded by a beam of electrons of sufficient energy, and they are converted into photons by bremsstrahlung directly within the article to be probed, which article is likely to contain photofissile material. No target is added to the package to perform this conversion. Preferably, the article to be probed is a package of radioactive waste, in which the container is made of thick absorbent concrete.

5 Claims, 2 Drawing Sheets

(56) References Cited

U.S. PATENT DOCUMENTS

| | | | |
|---|---|---|---|
| 5,487,394 A * | 1/1996 | Shiu et al. | 128/846 |
| 5,495,106 A | 2/1996 | Mastny et al. | |
| 5,838,759 A * | 11/1998 | Armistead | 378/57 |
| 5,994,706 A * | 11/1999 | Allen et al. | 250/454.11 |
| 6,452,992 B1 * | 9/2002 | Umiastowski | 376/170 |
| 6,882,095 B2 * | 4/2005 | Avnery | 313/361.1 |
| 2002/0169351 A1 * | 11/2002 | Brown | 588/1 |
| 2003/0165211 A1 * | 9/2003 | Grodzins et al. | 376/155 |
| 2005/0135534 A1 * | 6/2005 | Jones et al. | 376/153 |
| 2006/0054013 A1 * | 3/2006 | Rodney et al. | 89/36.02 |

OTHER PUBLICATIONS

Jallu et al., "Photoneutron production in tungsten, praseodymium, copper and beryllium by using high energy electron linear accelerator", Nuclear Instruments and Methods in Physics research B 155 (1999) pp. 373-381.*

Yeates et al., "High Resolution Neutron Velocity Spectrometer with Betatron Source", The Review of Scientific Instruments, vol. 28, No. 7, pp. 514-524 (Jul. 1957).*

* cited by examiner

METHOD AND APPARATUS FOR PROBING NUCLEAR MATERIAL BY PHOTOFISSION

The present invention relates to a method and to apparatus for probing an article containing nuclear material. The material is irradiated by means of a beam of particles having sufficient energy to cause photofission of actinide elements contained in the nuclear material.

Photofission is nuclear fission, i.e. the nucleus of a heavy atom is split and a certain amount of energy is released, and it is caused by the incidence of energetic photons, in particular on acnitides such as uranium and plutonium. The de-excitation of an impacted atom causes prompt neutrons to be emitted, together with a much smaller quantity of delayed neutrons. A neutron detector serves in particular to detect the actinides that are present.

The present invention finds a particularly advantageous application in the field of characterizing packages of nuclear waste, in particular in order to determine where they are to be stored. The term "package" designates concrete waste drums having a diameter of about one meter or more, or indeed metal containers having a volume that may be as much as several cubic meters. It is also important when storing radioactive waste to know the nature and the activity of radiation emitters and in particular of actinides.

U.S. Pat. No. 4,617,169 (Brodzinski) proposes a passive method for detecting nuclear matter in a package of waste. That method does not use probe particles. By means of both gamma and neutron detectors placed outside the package, attempts to made to extract either gamma rays characteristic of a radioactive nucleus that is present, or else emissions of neutrons, where appropriate. That technique is commonly used for characterizing packages of nuclear waste. Nevertheless, it does not make it possible to identify emitters of alpha radiation which is stopped entirely within the package, and it is unsuitable for probing packages of large dimensions containing small quantities of radioactive material.

Active methods are also known that are more sensitive and that make it possible to have a detection limit that is considerably lower. In such methods, the waste is subjected to a flux of neutrons and/or photons, itself obtained by electron bombardment of a target placed in the immediate vicinity of the waste drum.

The probe particles used are either photons, or neutrons, or both together.

Photons, generally of the gamma type, can be produced either by radioactive decay, or by bremsstrahlung ("braking radiation"). Under such circumstances, a beam of electrons having sufficient energy (several megaelectron-volts (MeV)) strikes a target that is generally made of tungsten, and electrons passing very close to atoms in the target give rise to braking radiation characterized by a gamma photon of energy no greater than the energy of the incident electron.

Neutrons, which constitute the other alternative, can be produced either directly by a neutron source, or from nuclear reactions, e.g. by bombardment of a beryllium target constituting a converter. Thus, U.S. Pat. No. 4,497,768 (Caldwell) proposes evaluating solely the quantities of fissile or fertile material in a sample from pulsed irradiation of gamma photons and neutrons. U.S. Pat. No. 5,495,106 (Matsny) proposes a setup for measuring possible contamination in the ground from pulsed X-ray irradiation. U.S. Pat. No. 5,838,759 (Armistead) proposes a tool for preventing contraband in nuclear material by X-ray or neutron bombardment of containers moving relative to the X-ray emitter. French patent No. 2 726 090 (equivalent to U.S. Pat. No. 5,828,069, Umiastowski) describes an enclosure for counting neutrons that includes neutron-moderator layers and layers of cadmium for shielding.

Finally, French patent No. 2 764 383 (equivalent to U.S. Pat. No. 6,452,992, Umiastowski) is known and is described in greater detail below. In general, the interaction between a photon of a few MeV and a nucleus, and providing the excitation is sufficient, can provide enough energy to the nucleons to give rise to nuclear reactions. The nucleus de-excites, generally emitting either one (or more) photons, or else one (or more) neutrons, or indeed, more rarely, charged particles (p, α, . . . ). With actinides, the excited nucleus may also disintegrate by fissioning. There exists an energy range for which the effective capture cross-section of photons by the nucleus is relatively large. This is the giant dipole resonance (GDR) range. For intermediate energies (typically lying in the range 25 MeV for light nuclei to 12 MeV for heavier nuclei), the nucleus is excited in a collective mode, giving rise to an electrical resonance mode due to protons moving relative to neutrons. The integral of the total cross-section is given by the dipole sum rule:

$$\int_0^\infty \sigma \cdot dE \approx 60\left(\frac{NZ}{A}\right) mbarn \cdot MeV$$

where N, Z, and A conventionally designate the total numbers of neutrons, protons, and nucleons.

It can be seen that the GDR can induce cross-sections of a fraction of a barn, of the same order of magnitude as standard nuclear reactions (strong interaction), e.g. neutron reactions, even though it is itself of electromagnetic origin. With photons of these energies, it thus constitutes a physical phenomenon of considerable importance.

For minor actinides, the major de-excitation paths are neutron emission, mainly (γ, n) and (γ, 2n), and photofission (disintegration by fission). It is found that these three possible paths are practically equiprobable. Fission therefore contributes in practice to one-third of the total integrated photonuclear cross-section.

French patent No. 2 764 383 (equivalent to U.S. Pat. No. 6,452,992) describes a system as shown in FIG. 1. There can be seen a converter 1 used for generating gamma photons from electrons supplied by a particle accelerator 5. When the electrons come very close to the nuclei of atoms in the target constituting the converter 1, they generate braking radiation and they lose energy. Several interactions of this type take place in succession, until the electrons have lost substantially all of their energy. Photons 2 pass through air so as to be delivered to the package 3 that is to be probed. It is thus these photons that are used as a probe. Detection is performed by means of neutron detectors 4 placed all around the package. Because of the magnitude of the "gamma flash" when the packet of electrons is sent, the detectors 4 are dazzled in two ways. Firstly, the enormous quantity of gamma photons produced by bremsstrahlung from the electron beam can lead to ionizations in the neutron detectors. Secondly, since the conversion target has a high atomic number, it produces, under the effect of photon irradiation, parasitic neutrons in quantities greater than the quantities of prompt neutrons coming from the photofission.

According to the prior art taught by U.S. Pat. Nos. 4,497,768 and 6,452,992 that use a photon probe, the "gamma flash" induces background noise that is several orders of magnitude greater than the useful signals. One solution proposed by U.S. Pat. No. 4,497,768 consists initially in thermalizing the neutrons and then in measuring the prompt neutrons coming from the fission reactions induced by neutrons, i.e. at about 0.5 milliseconds (ms) to 2.5 ms after the flash, by surrounding the detectors with cadmium so as to absorb the slow thermalized neutrons. The immediate consequence is to generate a very considerable neutron environment (neutron noise) that drowns the useful signal.

Another document, U.S. Pat. No. 5,838,759, makes use of a radioactive source and a beryllium converter to generate neutrons as probe particles, and then measures the gamma radiation lines that are characteristic of the elements that have captured a neutron, by making use of gamma detectors. Nevertheless, in that technique, a neutron flash dazzles the detectors and makes it necessary to take measurements only after the flash.

Finally, U.S. Pat. No. 5,495,106 proposes using X-rays (in reality gamma rays produced by bremmsstrahlung of electrons impacting a target) in order to create photofission in contaminants present in the ground: uranium, plutonium, and beryllium. It then proposes measuring the neutrons that have been produced by said contaminants up to 100 ms after delivering the pulse of photons.

It is therefore necessary to inhibit the detectors 4 during the "gamma flash", which restricts the system to measuring delayed neutrons that arrive well after the flash. A consequence of this detection is that it is not possible to identify any actinides present in the package, which constitutes a first limitation on that method.

Furthermore, the package is generally probed as a whole, since once photons have been created they continue to travel in a straight line without it being possible to direct them to a specific location of the package. It is therefore not possible, in that prior art system, to locate waste accurately within a package.

Furthermore, the spectrum of the bremsstrahlung photons extends from zero to the maximum energy of the incident electrons (the rare circumstance of an electron being stopped and all of its energy being radiated). By way of example, such a spectrum is as shown in FIG. 2, where a 50 MeV electron strikes a tungsten converter having thickness of 5 millimeters (mm). Photon density decreases exponentially with energy, so the majority of photons are emitted at low energy. In this example, each electron emits on average about forty photons of which only 0.6 lie in the energy range that is "useful" for GDR, i.e. 10 MeV to 20 MeV.

If the emitted photons interact with an actinide nucleus present in the target to be probed, those of them that have the right energy can excite giant dipole resonance (GDR) and possibly cause nuclei to fission.

During fission, neutrons are emitted during de-excitation: these are prompt neutrons. However the fission fragments are themselves generally radioactive and in excited states. Some of them emit neutrons with a time delay relative to the fission itself (this depending on the half-life of the fragment): these are delayed neutrons.

Detecting the quantity of actinides relies on measuring the number of these delayed neutrons, after a burst of electrons has been delivered by the accelerator against the target, thereby producing a gamma flash.

The quantity of delayed neutrons produced by photofission is proportional to the mass of actinides present, in accordance with the following linear relationship:

$$n^*/s \propto m_{[g]} I_{[\mu A]}$$

The number of delayed neutrons emitted per second is proportional to the mass of elements capable of fissioning (by photofission), and to the mean electron current. The coefficient of proportionality depends on photon yield, on the transport and the attenuation of the photons, and on the cross-sections of the various elements under consideration.

It should be observed that the method according to French patent No. 2 764 383 (equivalent to U.S. Pat. No. 6,452,992) makes it possible by measuring the number of delayed neutrons to deduce the total mass of actinides in the target. This measurement is therefore most advantageous since it is fast (a few minutes to a few hours once the package is in place) and non-destructive. Nevertheless, it does not make it possible to identify different actinides directly.

A second limitation of that method according to French patent No. 2 764 383 (equivalent to U.S. Pat. No. 6,452,992), lies in the fact that it is only the mass of the actinides that is measured and not their activity.

The delayed neutrons are emitted inside the package and their number n* is proportional to the intensity of the electron beam and to the mass $m_g$ of actinides present in the package. After emission, they are subjected to repeated impacts and slowdowns, and then diffuse to the outside of the package and travel through ambient air before reaching a detector. That process means that the number of delayed neutrons that are detected is a small fraction of the number of neutrons that are emitted, principally because of absorption within the package.

The proportion of detected delayed neutrons is increased when the distance to be traveled inside the package of waste is small. It therefore depends strongly on the position of the actinide within the package. If d designates the distance between the position of the actinide and the outside of the package, the number n* of detected neutrons will thus be associated with the number of pulses S per second of the detector by the following approximate relationship:

$$S_{[counts/s]} \propto e^{-\alpha d} n^*$$

The coefficient of proportionality depends on the shape of the apparatus (solid angle) and on the efficiency of the detector used (number of counts per neutron reaching the detector). Speaking rigorously, the coefficient $\alpha$ and the coefficient of proportionality depend on the energy of the neutron. However, in practice, it can be assumed that the energy spectrum of the delayed neutrons is identical to that of conventional fission (induced by neutrons) with mean energy around 450 keV. This makes it possible to eliminate the incidence of spectral distribution which can differ depending on the type of actinide present in the package of waste. There then remain only two unknowns: the quantity m of radioactive material, and its location within the package expressed in terms of its distance d from a given detector. In order to determine these two unknowns, use is made either of a plurality of detectors, or of a plurality of measurements, e.g. by causing the package to turn about its central axis. In order to improve the accuracy of the measurement, both techniques can be used together.

The direct relationship between the number of counts measured by the detector and the total actinide mass:

$$s_{[counts/s]} = A \cdot m_{[g]} I_{[\mu A]}$$

can then be written where A is considered as a parameter that depends on prior measurements (calibration). It establishes clearly that the number S of pulses per second measured by the detectors is proportional to the mass m of actinides present in the package.

Each detector is thus calibrated to obtain the exact value corresponding to its own coefficient of proportionality A. Since the thickness d of material passed through is unknown, it is possible to use a plurality of detectors (in theory two that are situated at 180° on either side of the package should suffice) to deduce therefrom the two unknowns d and m. Naturally, in the highly probable circumstance of there being a plurality of actinides situated at a plurality of locations and all emitting, it is necessary to sum their various contributions.

A third limitation of that method according to French patent No. 2 764 383 (equivalent to U.S. Pat. No. 6,452,992), lies in noise, which limits the sensitivity of the system to a value that is too high to make it possible to classify the package into a storage category and thus to determine the location where it ought to be stored.

Experiment shows that this detection limit is about 5 grams per tonne (g/t) for electrons of 15 MeV. Naturally, if the actinide is not at the center of the package, or if the package is smaller in size, then the detection limit will be that much smaller (exponential variation).

However this limit of 5 g/t is much too high for the technique to be used to determine where the package is to go, and possibly in order to change classification from waste A to B. By way of example, it is assumed that a package containing nuclear waste is coated in concrete having mean relative density of 1.74. The total weight of the package is 4.7 (metric) tonnes (t) for dimensions of 1.5×1.5×1.2 meters (m). It is assumed that the package contains mainly $^{239}$Pu.

The maximum acceptable activity (for the isotope in question) for TFA package storage is 100 becquerels per gram (Bq/g). The radioactivity of $^{239}$Pu is 2.284 giga becquerels per gram (GBq/g). It can thus be deduced that the TFA classification limit for this type of package needs to satisfy the following:

$$\left(\frac{m_{239_{Pu}}}{m_{package}}\right) \leq 43.8 \text{ mg/t}$$

For this package that weighs about 4.7 t, it is therefore necessary to be able to detect masses of less than 200 milligrams (mg). It can be seen that it is necessary to obtain detection sensitivities that are about 100 times smaller than those that can be reached using the system of French patent No. 2 764 383 (equivalent to U.S. Pat. No. 6,452,992).

In other words, the main drawbacks of prior art systems and in particular of French patent No. 2 764 383 (equivalent to U.S. Pat. No. 6,452,992) are as follows:

Firstly, neutrons inside the waste drum follow poorly-controlled paths, which means that not all the regions within the drum can be reached, and also that the enormous quantity of neutrons (as produced by photons impacting the target) dazzles of all of the detectors, so as to make it impossible to measure prompt neutrons. Only delayed neutrons can be measured effectively, and this greatly affects measurement sensitivity. Finally, the efficiency of the method is extremely low, with a very small fraction of the emitted photons having sufficient energy to trigger a photofission reaction.

In addition, when the waste drum is subjected not to neutrons, but to very high energy photons (produced by electrons impacting on a target placed in the immediate vicinity of the waste drum), the distribution within the entire working section is, a priori, uniform, which constitutes a major advantage. Nevertheless, the depth of photon penetration is small, and the very great majority of the photons that have insufficient energy are stopped within the very first centimeters, which means that it is not possible to determine the composition of the drum throughout its thickness. Finally, although the photons produced by electron impact travel a priori in straight lines (depending on the angle of incidence of the electron that creates them), the photon beam as a whole is nevertheless subject to a certain amount of divergence, which is sufficient to dazzle the neutron detector.

More generally, the method according to French patent No. 2 764 383 (equivalent to U.S. Pat. No. 6,452,992) presents the following three drawbacks: firstly it is the mass of actinides that is measured and not their activity; secondly it is not possible to identify which actinides are present; and finally it is not possible to bring the sensitivity limit down far enough to be able to determine the category in which the waste should be stored.

An object of the present invention is thus to improve prior art systems by proposing a device that is capable of detecting prompt and delayed neutrons efficiently and simply.

It is known that the ratio between prompt neutrons and delayed neutrons varies strongly with the type of actinide under consideration. By enabling prompt neutrons to be measured in addition to measuring delayed neutrons, the present invention makes it possible to determine this ratio and thus to determine the type of actinide present in the package.

Another object of the present invention is to provide an active method that presents great detection sensitivity, and that is suitable for focusing this sensitivity on a specific zone within the package. The invention also seeks to measure accurately any quantity of actinides present in an article of large size.

At least one of the above objects is achieved with a novel method of probing an article containing potentially radiation-emitting elements. The article is irradiated by means of a beam of particles having sufficient energy to cause photofission in the radiation-emitting elements within the article. The neutrons produced by photofission are measured by means of at least one neutron detector. In the invention, the particles probing the article by photofission are electrons that irradiate the article directly, and the electrons are converted into photons suitable for generating photofission directly by the article being probed. Unlike the prior art, in the present invention electrons are used directly to strike the article for probing, and no target of heavy metal (such as tungsten, for example) is added in front of or within the article, for the purpose of converting electrons into photons suitable for generating photofission in potentially radiation-emitting elements.

The article for probing is generally constituted by a peripheral container, and content occupying a central portion. When the article is a package of nuclear material, the container is generally made of thick absorbing concrete (20; FIG. 3), and the content includes nuclear material.

For such a package comprising a large thickness of absorbing concrete surrounding the nuclear matter, the invention is particularly advantageous since it gives rise mostly to braking radiation within the concrete container. The ingredients of concrete have small atomic numbers, on average around 20 (the heaviest ingredient, barium of atomic number 56, being present in very small quantity), which means that the photofission reaction creates practically no direct neutrons therein that would otherwise dazzle the detectors.

More generally, measurement is enhanced by placing around the article to be probed or within its container, a material having an atomic number that is sufficiently high for bremsstrahlung reactions to be sufficiently numerous to provoke photofission and sufficiently weak to limit neutron production. By way of example, it is possible to work in the range 10 to 50, in non-limiting manner.

Furthermore, it is known that at the energies under consideration and on a material having high atomic number, such as tungsten, electron to photon conversion takes place over a few millimeters. When it takes place in concrete (20; FIG. 3), this conversion takes place over several decimeters (dm), such that if the thickness of the concrete is less than said distance, there remain electrons that have not been converted into photons that strike directly against the waste contained in the article.

Under such circumstances, electrons meeting a piece of potentially fissile material directly, e.g. uranium, become converted into photons in a few millimeters, and then immediately afterwards can give rise to a photonuclear reaction. Thus, a container of sufficiently small thickness makes it possible to benefit from greater ease in directing electrons as opposed to photons.

To sum up, the invention makes it possible to make full use of the directivity of electrons in order to scan the contents of the article by selecting a container that is made of a material having atomic number that is sufficiently low, and by giving it thickness that is sufficiently small for a sufficient quantity of electrons to pass through it before being converted into photons. The term "sufficient portion" is used to mean a quantity that is sufficient for the photofission reactions that follow to be capable of being measured within a signal-to-noise ratio that is compatible with requirements.

The above characteristics combine to locate the photofission reactions of the nuclear materials in the package as closely as possible, and if so desired, to distribute them relatively uniformly throughout the volume of nuclear materials to be probed.

The method of the invention presents numerous advantages.

A first advantage is that electrons are easier to manipulate than photons: it is possible to vary the size of the electron beam so as to vary the precision of irradiation, the electron beam can be focused on a portion of the nuclear material, electrons can be transported, deflected, made to scan in well-targeted or defined manner, etc. It is thus possible to ensure that the electron beam scans all or part of the nuclear material, or indeed the entire article for probing, which may be a drum, for example. The electron beam is then moving relative to the article. In the same manner, it is possible to move the article in translation and/or in rotation relative to the electron beam so that the electron beam irradiates all or part of the content of the package.

The electron beam that irradiates the package is preferably pulsed, and said at least one neutron detector detects the delayed neutrons generated by photofission after the flash that results from the electron beam pulse. Said at least one neutron detector may also detect prompt neutrons emitted during the electron beam pulse.

Advantageously, insofar as electrons lose their energy very quickly in air and disperse easily, the nuclear material may be irradiated by bringing up the electron beam via an evacuated line.

In an embodiment of the invention, by scanning the article with the electron beam, particles emitted by the scanned portions are detected simultaneously, thereby enabling nuclear material to be located within the article.

A second advantage consists in that the electrons having the power to penetrate into the material. As a result, they can come very close to the actinides present in the package, thereby increasing the chances of a nuclear reaction. This leads to a considerable improvement in energy efficiency and to greater measurement sensitivity.

A third advantage lies in that the direct use of electrons makes it possible to minimize the noise induced by gamma radiation on first impact (the bremsstrahlung gamma flash) which can dazzle neutron detectors. Thus, when the electron beam irradiates the nuclear matter in the form of at least one pulse, it is possible to detect and measure prompt neutrons emitted during the pulse. It is also possible to detect and measure delayed neutrons emitted after the pulse. The present invention thus makes it possible both to measure the prompt neutron flux and to measure the delayed neutron flux. The second measurement serves to determine the mass of actinides, as taught in French patent No. 2 764 383 (equivalent to U.S. Pat. No. 6,452,992) or in U.S. Pat. No. 4,497,768, but with much better resolution (no noise, better distribution of the probe-photons). Advantageously, the ratio of the two measurements can be used also to determine the isotope composition of actinides present in the material (radiation-emitting elements). As already mentioned, the various different actinides present different ratios of prompt neutrons over delayed neutrons. Experimental measurement of the ratio thus constitutes a characteristic of the isotope in question.

It is thus possible to determine the total quantity of actinides present in the radiation-emitting elements from the measured prompt neutrons and the delayed neutrons.

In another aspect of the invention, apparatus is provided for probing an article containing radiation-emitting elements. The apparatus comprises means for irradiating said article by means of a beam of particles of energy that is sufficient to provoke photofission of radiation-emitting elements in the article, and at least one neutron detector for measuring the neutrons produced by photofission. According to the invention, said particles are electrons directly irradiating the nuclear material, with conversion of electrons into photons suitable for generating photofission taking place directly in the article to be probed.

The electron beam is preferably transported via an evacuated line having an outlet window put into contact with the article. Advantageously, the means for detecting prompt neutrons are disposed behind the article when the electron beam arrives via the front of the article.

Other advantages and characteristics of the invention appear on examining the following detailed description of a non-limiting embodiment and the accompanying drawings, in which.

Although the invention is not limited thereto, the description below relates to an embodiment suitable for characterizing waste of small size inside a package of large size.

Figure 1:
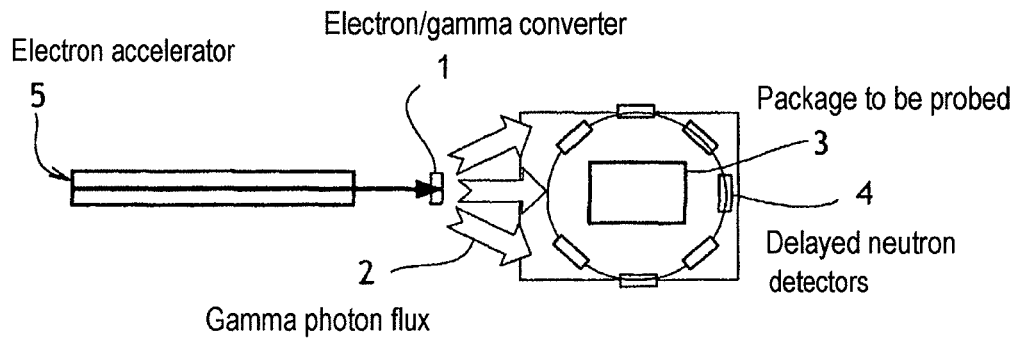
FIG. 1 is a simplified diagrammatic view of prior art apparatus for characterizing nuclear waste.
Figure 2:
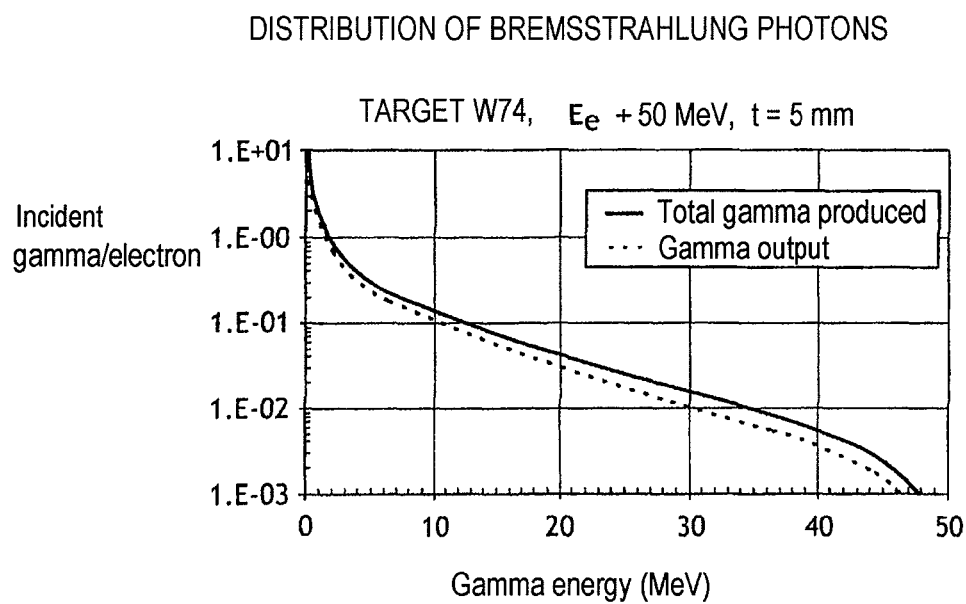
FIG. 2 is a graph showing the spectrum of photons emitted by bremsstrahlung for an electron having energy of 50 MeV striking a tungsten target that is 5 mm thick, as in the prior art.
Figure 3:
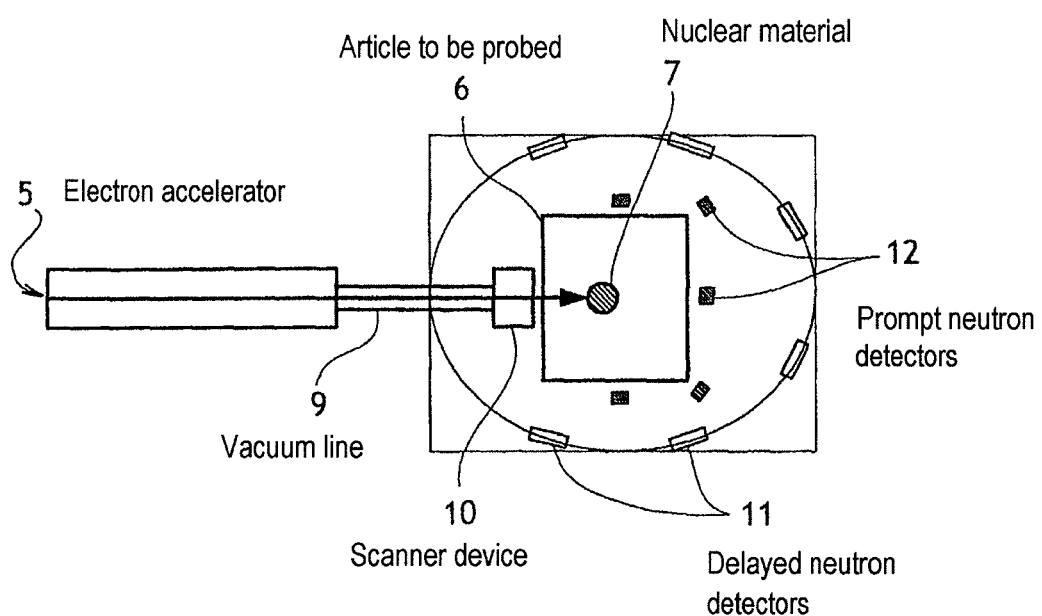
FIG. 3 is a simplified diagrammatic view of a device of the present invention for characterizing nuclear material.

In FIG. 3, there can be seen an article 6 for probing that is of large size and that contains a very small quantity of nuclear material 7, an actinide. This material 7 is located at a specific point within the article 6. There can be seen an electron accelerator 5 serving to emit an electron beam 13 in pulsed form for striking the nuclear material 7. This beam 13 is transported by an evacuated line 9 (identified as a vacuum line) constituted by an evacuated tube connecting the outlet from the accelerator 8 to the article 6 for probing. Nevertheless, in order to be able to scan the electron beam 13, a scanner device 10 based on magnetic deflector elements is installed (techniques that are well known in the field of accelerators) and controlled by a processor unit (not shown) for accurate localization of the nuclear material 7 in the article 6 or for testing a very large area, possibly the article as a whole on a single occasion. An outlet window is also provided at the end of the evacuated line 9. This window may come into contact with the article 6, e.g. outside the scanner device, so as to avoid passing the electron beam through air.

The present invention makes it possible to measure prompt neutrons emitted during electron pulses, while continuing to measure delayed neutrons coming from the article to be probed, and thus in a period of a few milliseconds to 100 ms, or even longer after the pulse. Concerning delayed neutrons, the apparatus is identical to that described in French patent No. 2 764 383 (equivalent to U.S. Pat. No. 6,452,992) or in U.S. Pat. No. 4,497,768. To do this, delayed neutron detectors 11 are disposed around the article 6. In contrast, for prompt neutrons, the use of electrons as the probe beam serves to escape from the background noise of the "gamma flash". The electrons strike only a small portion of the surface of the article so they end up (as do all of the various particles produced by the succession reactions within the article) either by being back-scattered (rearwards), or else by being absorbed in the article itself. It is thus possible to measure the prompt neutrons emitted during the pulse with prompt neutron detectors 12. It is shown that the optimum position for these detectors from the signal/noise point of view is to place them behind the article to be probed. The detected prompt neutron signal (much more intense than the above-mentioned delayed neutron signal) is used for deducing the quantity of nuclear material present in the package. The delayed neutron signal is also measured between two pulses. Furthermore, it is the combination of these two items of information obtained simultaneously (prompt signal and delayed signal) that makes it possible, by taking their ratio, to determine the isotope of the actinide under test. Moving the article (vertically and/or in rotation about its vertical axis) makes it possible to locate accurately the position where the material 7 is to be found within the article 6. Accuracy is determined by the size of the electron beam 13. Specifically by using a direct probe electron method of the invention, it is possible for the size of the electron beam to be as small as might be desired (within the limit set by the emittance of the beam), merely by placing appropriate focusing equipment (not shown) in the evacuated transport line 9.

Another feature of the present invention relates to the width of the probe beam pulse. Whereas with photons or neutrons, the pulses used are generally very intense (up to 200 milliamps (mA)) and very short (generally shorter than 4 microseconds (μs)), it is shown that in the present circumstances, pulses that are as long as 4 ms, for example, i.e. 1000 times longer, can equally well be used with intensities that can be much smaller, a few microamps being sufficient.

Naturally, the invention is not limited to the examples described above, and numerous modifications can be made to the examples without going beyond the ambit of the invention.

What is claimed is:

1. A method of probing an article containing radiation-emitting elements comprised of actinides, comprising:
   (a) irradiating an article with an electron beam;
   wherein the article comprises:
   a peripheral concrete material container made of concrete, and
   radioactive waste content located in an interior of the container, wherein the content includes radiation-emitting elements comprising actinides,
   wherein the electron beam irradiates the article directly, including the container, without a Bremsstrahlung target being disposed in a path between the electrons of the electron beam and the article,
   wherein the irradiating causes electrons from the electron beam to pass through the concrete and into the interior, wherein thickness of the concrete is less than a distance which would have caused the electrons to convert into photons in concrete;
   (b) striking a nuclear material with electrons from the electron beam which passed through the concrete in step (a), wherein the striking causes conversion of the electrons into photons;
   (c) generating photofission in the actinides with photons produced by the conversion of the electrons in step (b), wherein the photofission causes neutrons to be produced; and
   (d) operating at least one neutron detector to measure neutrons produced by the photofission in step (c).

2. A method according to claim 1, wherein, by irradiating the article by means of the electron beam, particles emitted by irradiated portions are detected simultaneously so as to locate the radiation-emitting elements within the article.

3. A method of probing an article containing radiation-emitting elements comprised of actinides, comprising:
   (a) irradiating an article with a pulsed electron beam,
   wherein the article comprises:
   a peripheral concrete material container made of concrete, and
   radioactive waste content located in an interior of the container, wherein the content includes radiation-emitting elements comprising actinides,
   wherein the electron beam irradiates the article directly, including the container, without a Bremsstrahlung target being disposed in a path between the electrons of the electron beam and the article,
   wherein the irradiating causes electrons from the electron beam to pass through the concrete and into the interior, wherein thickness of the concrete is less than a distance which would have caused the electrons to convert into photons in concretes;
   (b) striking a nuclear material with electrons from the electron beam which passed through the concrete in step (a), wherein the striking causes conversion of the electrons into photons;
   (c) generating photofission in the actinides with photons produced by the conversion of the electrons in step (b), wherein the photofission causes delayed neutrons to be produced after a flash resulting from an electron beam pulse and causes prompt neutrons emitted during the electron beam pulse;
   (d) operating at least one neutron detector to measure neutrons produced by the photofission in step (c); and
   (e) calculating the ratio of measured prompt neutrons to delayed neutrons so as to determine the isotopic composition of actinides in the radiation-emitting elements.

4. A method of probing an article containing radiation-emitting elements comprised of actinides, comprising:
   (a) irradiating an article with a pulsed electron beam,
   wherein the article comprises:
   a peripheral concrete material container made of concrete, and
   radioactive waste content located in an interior of the container, wherein the content includes radiation-emitting elements comprising actinides,
   wherein the electron beam irradiates the article directly, including the container,
   wherein the irradiating causes electrons from the electron beam to pass through the concrete and into the interior, wherein thickness of the concrete is less than a distance which would have caused the electrons to convert into photons in concrete;

(b) striking a nuclear material with electrons from the electron beam which passed through the concrete in step (a), wherein the striking causes conversion of the electrons into photons;
(c) generating photofission in the actinides with photons produced by the conversion of the electrons in step (b), wherein the photofission causes delayed neutrons to be produced after a flash resulting from an electron beam pulse and causes prompt neutrons emitted during the electron beam pulse;
(d) operating at least one neutron detector to measure neutrons produced by the photofission in step (c); and
(e) calculating the total quantity of actinides in the radiation-emitting elements from the measured prompt neutrons and delayed neutrons.

5. A method according to claim 4, wherein the irradiating is carried out by transporting the electron beam up to the article in a vacuum line.

\* \* \* \* \*